(No Model.)
E. MOWRY.
HAND CORN PLANTER.
No. 489,491.            Patented Jan. 10, 1893.
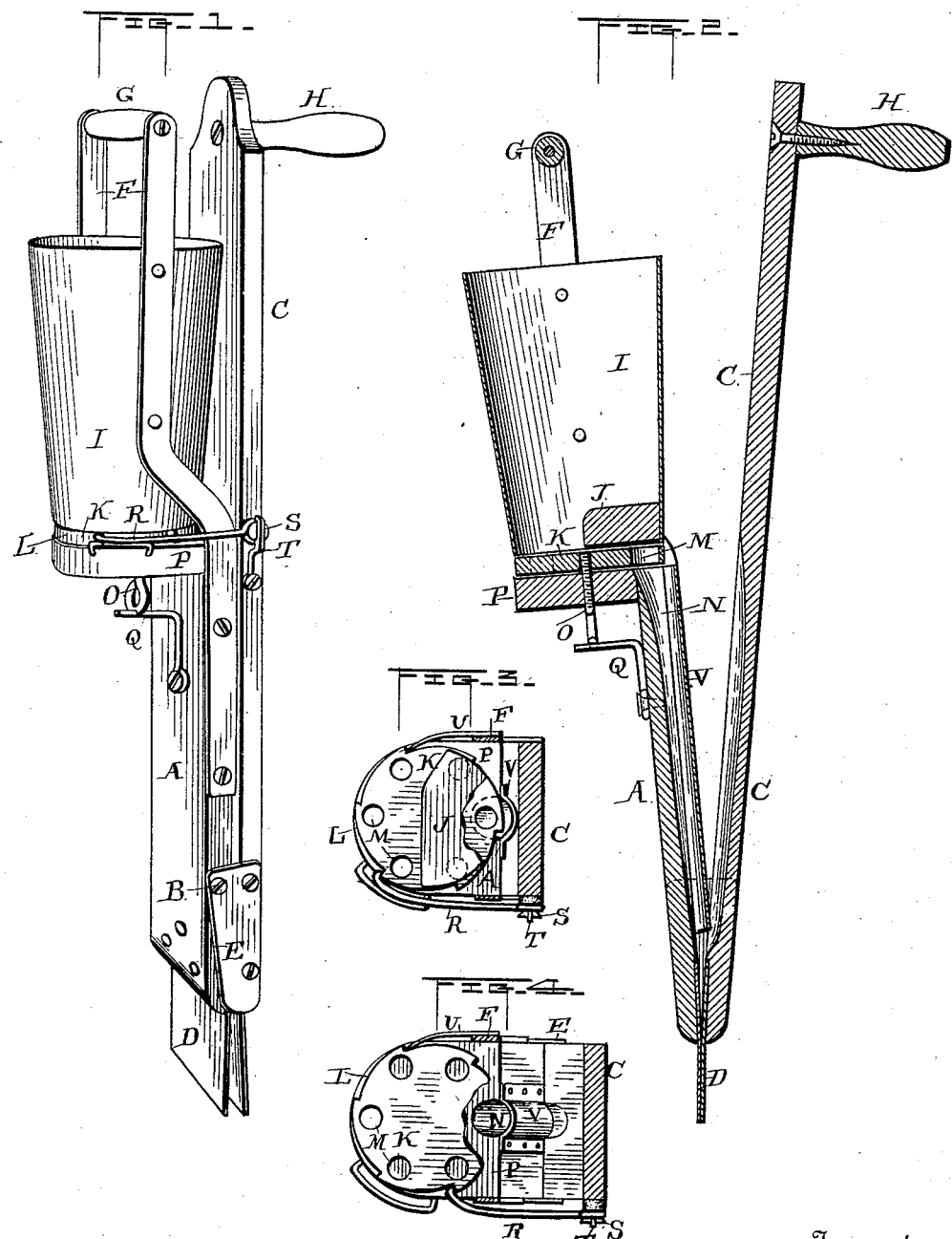
Witnesses
Severance
Geo. W. Harvey
Inventor
Edward Mowry
by Fenelon B. Brock
Attorney

UNITED STATES PATENT OFFICE.

EDWARD MOWRY, OF MAPLEWOOD, OHIO.

HAND CORN-PLANTER.

SPECIFICATION forming part of Letters Patent No. 489,491, dated January 10, 1893.

Application filed September 9, 1892. Serial No. 445,412. (No model.)

*To all whom it may concern:*

Be it known that I, EDWARD MOWRY, a citizen of the United States, residing at Maplewood, in the county of Shelby, State of Ohio, have invented certain new and useful Improvements in Hand Corn-Planters; and I do declare the following to be a full, clear, and exact description of the invention, such as will enable others skilled in the art to which it appertains to make and use the same, reference being had to the accompanying drawings, and to the letters of reference marked thereon, which form a part of this specification.

Figure 1 is a perspective view of a hand corn-planter to which I have applied my improvements. Fig. 2 is a longitudinal vertical sectional view of the same. Fig. 3 is a transverse section partly broken away, showing the seed disks and operating handle in one position, and Fig. 4 is a similar transverse section showing the operating handle at the opposite end of its vibration.

My invention relates to hand-corn planters, and it consists of the following construction and combination of parts, which will first be fully described and set forth in detail, and the features of novelty therein contained then pointed out and claimed.

In the drawings—A represents the main arm of the planter which is pivoted at B to the operating arm or handle C.

D are the usual blades for insertion in the ground, between which the seed corn is dropped when they are opened.

E are the side plates to which the arms A and C are pivoted and which overlap the edges thereof.

F represents a bail or strap secured to the opposite edges of the arm A, and surmounted by a handle G, opposite the handle H on the arm C.

I is the corn hopper or receptacle which is firmly secured to the bail F. It is open at the bottom except where it is provided with the segment block J.

K is the seed-disk, the periphery of which is provided with ratchet teeth L. This disk is provided with the usual seed receptacles M which become filled with corn and successively pass under the block J until they register with the seed drop tube N when the corn drops through the tube in a manner well known.

O is the pivotal pin of the disk K. It is threaded where it passes through the block P and the pin is adapted to be rotated so as to secure the adjustment of the seed-disk between the hopper I and the block P, in order to secure its proper tension and adjustment. This pin O has a notch formed in its lower end within which takes a pivoted latch piece Q so as to lock it securely at any adjustment. The eye in the pin O permits a tool to be inserted therein to effect its proper adjustment.

R is a hook or pawl which engages the ratchet teeth L of disk K, and is pivoted to a screw bolt S on arm C, which bolt is adapted to be screwed up against the spring pawl R to regulate the tension thereof of its engagement. To hold the screw S in its adjusted position, the pivoted latch T, carried by the arm C, is employed.

U is a spring stop pawl for locking the seed disk against any back motion of the same after each successive movement of the pawl R. The seed tube N is partly chamfered out of the arm A and partly formed of the metal trough V, the opposite arm or handle C being similarly chamfered to accommodate the seed tube.

I may if desired hinge the handle C about midway, so that it may fold over, and, together with the removable bail F, permit all the parts to be compactly placed, for transportation, storage, or the like.

I claim—

1. In a hand corn planter, the combination of the two bars or handles, one of which is provided with a hopper, seed disk, and seed tube, and the other with a pawl engaging the seed disk, and a regulating screw to adjust the tension of the pawl, having a latch for locking said screw in its adjusted position.

2. The combination, in a corn planter, of a hopper, a seed disk rotating at the bottom thereof, a pivotal shaft for the seed disk having a screw thread thereon, and provided with an adjusting catch, and a latch on the handle or bar engaging the catch on the shaft.

In testimony whereof I affix my signature in the presence of two witnesses.

EDWARD MOWRY.

Witnesses:
W. S. MUNCH,
W. F. CHARTER.